United States Patent
Shinohara (10) Patent No.: US 8,779,621 B2
(45) Date of Patent: Jul. 15, 2014

(54) COMMUNICATION APPARATUS AND COMMUNICATION METHOD

(75) Inventor: Yasushi Shinohara, Kanagawa (JP)

(73) Assignee: Sony Corporation (JP)

( * ) Notice: Subject to any disclaimer, the term of this patent is extended or adjusted under 35 U.S.C. 154(b) by 615 days.

(21) Appl. No.: 13/066,325

(22) Filed: Apr. 12, 2011

(65) Prior Publication Data

US 2011/0269496 A1    Nov. 3, 2011

(30) Foreign Application Priority Data

Apr. 28, 2010    (JP) ................. P2010-103359

(51) Int. Cl.
*H02J 1/00*    (2006.01)
(52) U.S. Cl.
USPC ............................................................. 307/1
(58) Field of Classification Search
USPC .......................................................... 307/1
See application file for complete search history.

(56) References Cited

U.S. PATENT DOCUMENTS

| | | | | |
|---|---|---|---|---|
| 5,889,273 A | * | 3/1999 | Goto | 235/492 |
| 6,079,622 A | * | 6/2000 | Goto | 235/492 |
| 7,782,040 B2 | | 8/2010 | Enomoto | |
| 8,430,326 B2 | * | 4/2013 | Koyama et al. | 235/492 |
| 2002/0130719 A1 | * | 9/2002 | Aoki | 330/284 |

FOREIGN PATENT DOCUMENTS

| | | | |
|---|---|---|---|
| JP | 2007-329674 A | | 12/2007 |
| JP | 2009-231901 | * | 8/2009 |

* cited by examiner

*Primary Examiner* — Jared Fureman
*Assistant Examiner* — Duc M Pham
(74) *Attorney, Agent, or Firm* — Lerner, David, Littenberg, Krumholz & Mentlik, LLP (57) ABSTRACT

A communication apparatus that performs communication with a communication medium while supplying power to the communication medium includes a communication distance detection unit configured to detect a distance to the communication medium and a transmission power control unit configured to control transmission power of a transmission amplifier in accordance with the detected distance.

6 Claims, 8 Drawing Sheets

COMMUNICATION APPARATUS AND COMMUNICATION METHOD

CROSS-REFERENCE TO RELATED APPLICATION

The present application claims priority from Japanese Patent Application No. JP 2010-103359 filed in the Japanese Patent Office on Apr. 28, 2010, the entire content of which is incorporated herein by reference.

BACKGROUND OF THE INVENTION

1. Field of the Invention

The present invention relates to a communication apparatus and a communication method, and more particularly to a communication apparatus that performs communication with a communication medium such as a card on which a non-contact integrated circuit (IC) chip is mounted or a mobile device, and a communication method.

2. Description of the Related Art

For example, a communication apparatus that functions as a reader and a writer is incorporated into an automatic ticket gate. The communication apparatus performs communication with a communication medium by supplying power to the communication medium when the communication medium approaches the communication apparatus.

Figure 10:
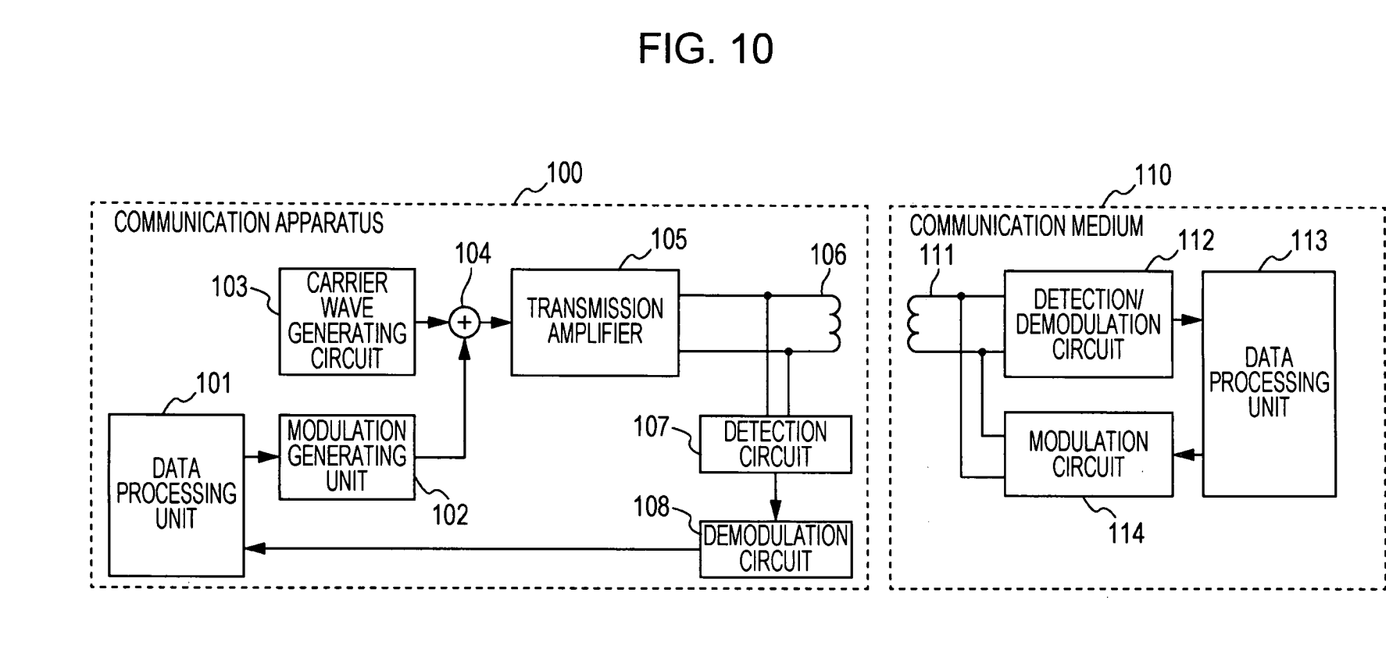
FIG. 10 is a block diagram illustrating an example of a general configuration of a communication apparatus and a communication medium.

FIG. 10 is a block diagram illustrating an example of the general configuration of a communication apparatus and a communication medium.

A communication apparatus 100 has a data processing unit 101 that processes data to be transmitted and received data, a modulation generating circuit 102 that generates a signal for modulation from the data to be transmitted, and a carrier wave generating circuit 103 that generates a carrier wave. The output of the modulation generating circuit 102 and the carrier wave generating circuit 103 is input to a modulator 104, and the carrier wave generated by the carrier wave generating circuit 103 is modulated using the signal generated by the modulation generating circuit 102. The modulated signal is amplified by a transmission amplifier 105 and output to an antenna 106. The antenna 106 is connected to a detection circuit 107 that detects the received signal, and the detected signal is demodulated by a demodulation circuit 108 and sent to the data processing unit 101.

On the other hand, a communication medium 110 has an antenna 111 that supplies power and that transmits or receives data by electromagnetically connecting to the antenna 106 of the communication apparatus 100 through electromagnetic induction. In addition, the communication medium 110 has a detection/demodulation circuit 112 that extracts data from a signal received by the antenna 111, a data processing unit 113 that processes the extracted data, and a modulation circuit 114 that modulates the processed response data and that sends the data to the antenna 111.

The communication apparatus 100 can perform non-contact communication with the communication medium 110 when the communication medium 110 approaches the communication apparatus 100. If the distance between the communication apparatus 100 and the communication medium 110 changes during the communication, the communication conditions also change and accordingly the communication quality may change. For example, when the communication medium 110 approaches the communication apparatus 100, a phenomenon in which the tuning frequency deviates may occur and accordingly the communication quality may deteriorate as the communication medium 110 approaches the communication apparatus 100. With regard to this phenomenon, a technology has been provided in which the tuning frequency does not change even if the distance between the communication apparatus 100 and the communication medium 110 changes, thereby stabilizing the communication quality (refer to, for example, Japanese Unexamined Patent Application Publication No. 2007-329674).

In addition, in order to execute processing with the communication medium 110 at high speed, the communication apparatus 100 is configured to have a wide communicable range so as to be able to start communication at a distance. This is realized by increasing the transmission power of a transmission amplifier of the communication apparatus 100. By increasing the transmission power of the transmission amplifier, the communication apparatus 100 can perform stable communication with the communication medium 110 located within the communicable range. However, since the communication medium 110 is supplied, by the communication apparatus 100, with the minimum power that is necessary for an internal circuit to operate when the communication medium 110 is separated from the communication apparatus 100 by a maximum communicable distance, the communication medium 110 may be supplied with unnecessarily large power when located close to the communication apparatus 100. Therefore, the communication medium 110 has a protection circuit to prevent the internal circuit from being broken even if excessive power is supplied.

SUMMARY OF THE INVENTION

A communication medium rectifies received power in order to adjust the received power to a power supply voltage that is suitable for the rating of an internal circuit thereof. When the received power is excessive, a protection circuit operates to forcibly reduce the excessive potential to a particular potential. However, reduction of potential by the protection circuit is invariably accompanied by generation of heat. Therefore, if the received power remains excessive for an extended period of time such as when the communication medium is left on a communication apparatus, the communication medium may be broken due to heating. For this reason, there has been a problem in that it is undesirable to, in a communication apparatus, increase the transmission power of a transmission amplifier.

It is desirable to provide a communication apparatus and a communication method configured to keep the transmission power of a transmission amplifier high while preventing breakage or deterioration of the performance of a communication medium due to heating even if the communication medium is located close to the communication apparatus for an extended period of time.

In the present invention, in order to solve the above problem, a communication apparatus is provided that performs communication with a communication medium while supplying power to the communication medium. The communication apparatus includes a communication distance detection unit configured to detect a distance to the communication medium and a transmission power control unit configured to control transmission power of a transmission amplifier in accordance with the detected distance.

In addition, in the present invention, a communication method is provided in which a communication apparatus performs communication with a communication medium while supplying power to the communication medium. The communication method includes the steps of detecting a distance to the communication medium with the communication apparatus and reducing transmission power of a transmission amplifier of the communication apparatus as the detected distance becomes smaller.

According to such a communication apparatus and a communication method, since the transmission power of the transmission amplifier of the communication apparatus can be maximized when the communication medium is not located close to the communication apparatus, the maximum communication distance can be extended. In addition, since the transmission power of the transmission amplifier of the communication apparatus is reduced as the communication medium approaches the communication apparatus, the communication medium can be prevented from receiving abnormally high power.

Since the communication apparatus and the communication method having the above configuration can keep high transmission power of the transmission amplifier, the maximum communication distance can be secured when the communication medium is located far from the communication apparatus. On the other hand, when the communication medium is located close to the communication apparatus, since the transmission power of the communication apparatus is reduced to transmission power that is necessary for communication with the communication medium, the communication medium can be prevented from being broken or the performance thereof can be prevented from being deteriorated due to excessive received power, and the power consumption of the communication apparatus can be reduced, which are preferable.

DESCRIPTION OF THE PREFERRED EMBODIMENTS

Embodiments of the present invention will be described in detail hereinafter with reference to the drawings.

Figure 1:
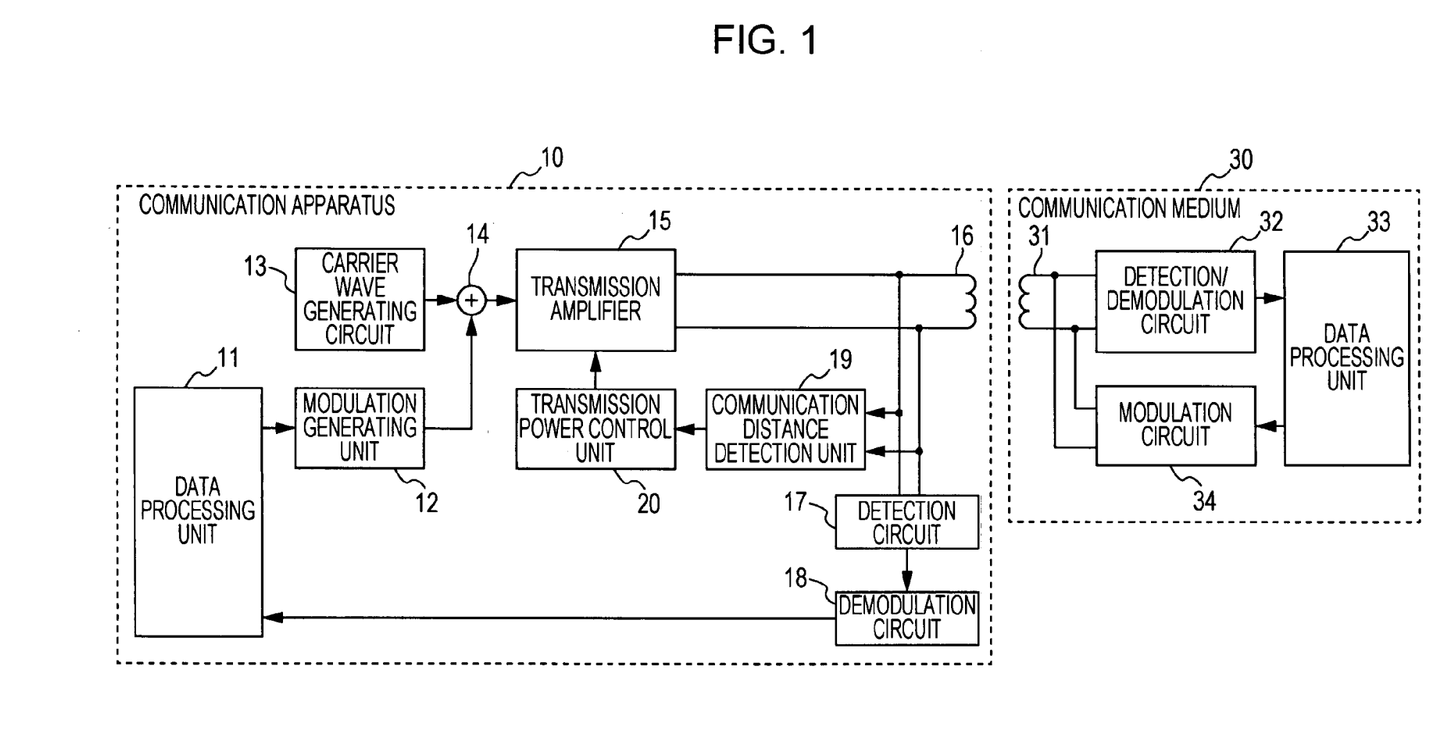
FIG. 1 is a block diagram illustrating the principle configuration of a communication apparatus according to an embodiment of the present invention.
Figure 2:
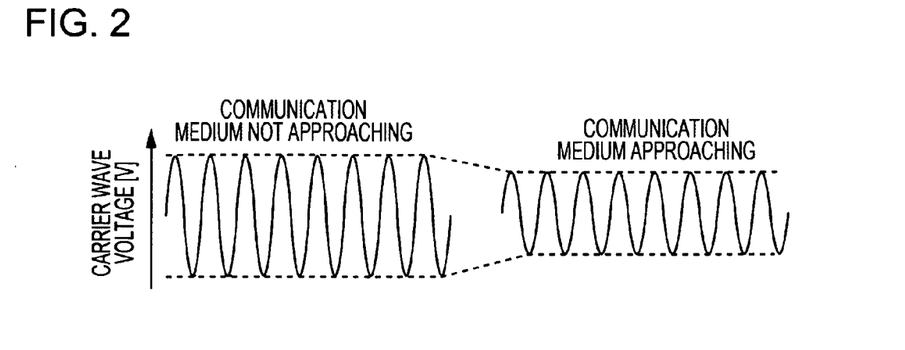
FIG. 2 is a diagram illustrating the transition of a carrier wave voltage in an antenna when a communication medium approaches the communication apparatus.

FIG. 1 is a block diagram illustrating the principle configuration of a communication apparatus according to an embodiment of the present invention. FIG. 2 is a diagram illustrating the transition of the carrier wave voltage in an antenna in relation to the approach of a communication medium.

A communication apparatus 10 has a data processing unit 11, a modulation generating circuit 12, a carrier wave generating circuit 13, a modulator 14, a transmission amplifier 15, an antenna 16, a detection circuit 17, and a demodulation circuit 18, and has the same configuration as that illustrated in FIG. 10. The communication apparatus 10 according to an embodiment of the present invention further includes a communication distance detection unit 19 that detects the distance to a communication medium 30 by monitoring the carrier wave voltage in the antenna 16 and a transmission power control unit 20 that controls the transmission power of the transmission amplifier 15. The communication medium 30 has an antenna 31, a detection/demodulation circuit 32, a data processing unit 33, and a modulation circuit 34, and has the same configuration as that illustrated in FIG. 10.

When the communication medium 30 approaches a range in which communication with the communication apparatus 10 is possible, the communication apparatus 10 transmits a carrier wave generated by the carrier wave generating circuit 13 to the communication medium 30 through the transmission amplifier 15 and the antenna 16. The communication medium 30 rectifies the carrier wave received by the antenna 31, and then adjusts the carrier wave to a certain voltage and generates power.

Here, when data processed by the data processing unit 11 is transmitted to the communication medium 30, the modulation generating circuit 12 converts the data into a baseband signal having a binary waveform and the modulator 14 modulates a carrier wave with the baseband signal. An amplitude-shift-keying (ASK) signal having a modulation factor of about 10%, which is a signal obtained by the modulation, is then transmitted through the transmission amplifier 15 and the antenna 16.

In the communication medium 30, the detection/demodulation circuit 32 detects and demodulates the ASK signal received with the antenna 31 in order to restore the data. The data is then input to the data processing unit 33 and subjected to data processing.

When the communication medium 30 transmits data to the communication apparatus 10, the data is modulated by the modulation circuit 34 in a state in which the communication medium 30 is receiving an unmodulated carrier wave from the communication apparatus 10, in order to cause a change in the carrier wave that is being received with the antenna 31. In the communication apparatus 10, because the change on the communication medium 30 side appears to the antenna 16 to be a change in current, the change is detected by the detection circuit 17 and the data is demodulated by the demodulation circuit 18 so as to be restored. The data is then sent to the data processing unit 11.

In addition, with respect to the carrier wave voltage in the antenna 16 of the communication apparatus 10, the amplitude of a carrier wave is largest when the communication medium 30 is located beyond the maximum communication distance of the communication apparatus 10, as illustrated in FIG. 2. On the other hand, when the communication medium 30 is placed at a position close to the communication apparatus 10, the amplitude of the carrier wave is attenuated. There is a correlation in which the degree of the attenuation changes in accordance with the distance between the communication apparatus 10 and the communication medium 30. On the basis of these change characteristics, the communication distance detection unit 19 can detect the distance to the communication medium 30 by monitoring the carrier wave voltage in the antenna 16.

The transmission power control unit 20 controls the transmission power of the transmission amplifier 15 in accordance with the distance to the communication medium 30 detected by the communication distance detection unit 19. At this time, the transmission power control unit 20 controls the transmission power of the transmission amplifier 15 so that the transmission power takes the fixed maximum value until the distance to the communication medium 30 reaches a certain value, and, as the distance to the communication medium 30 becomes shorter than the certain value, performs control such that the transmission power of the transmission amplifier 15 decreases.

In doing so, when the communication medium 30 is located far from the communication apparatus 10, since the transmission power of the transmission amplifier 15 is kept at a maximum without being restricted, the maximum communication distance can be secured. When the communication medium 30 is located close to the communication apparatus 10, since the transmission power of the transmission amplifier 15 is reduced to transmission power that is necessary for communication with the communication medium 30, the power consumption of the communication apparatus 10 can be reduced. With respect to the communication medium 30, since the received power does not become excessive even when the communication medium 30 is located close to the communication apparatus 10, heating due to the operation of a protection circuit does not occur, thereby preventing breakage or deterioration of the performance caused by excessive received power.

Figure 3:
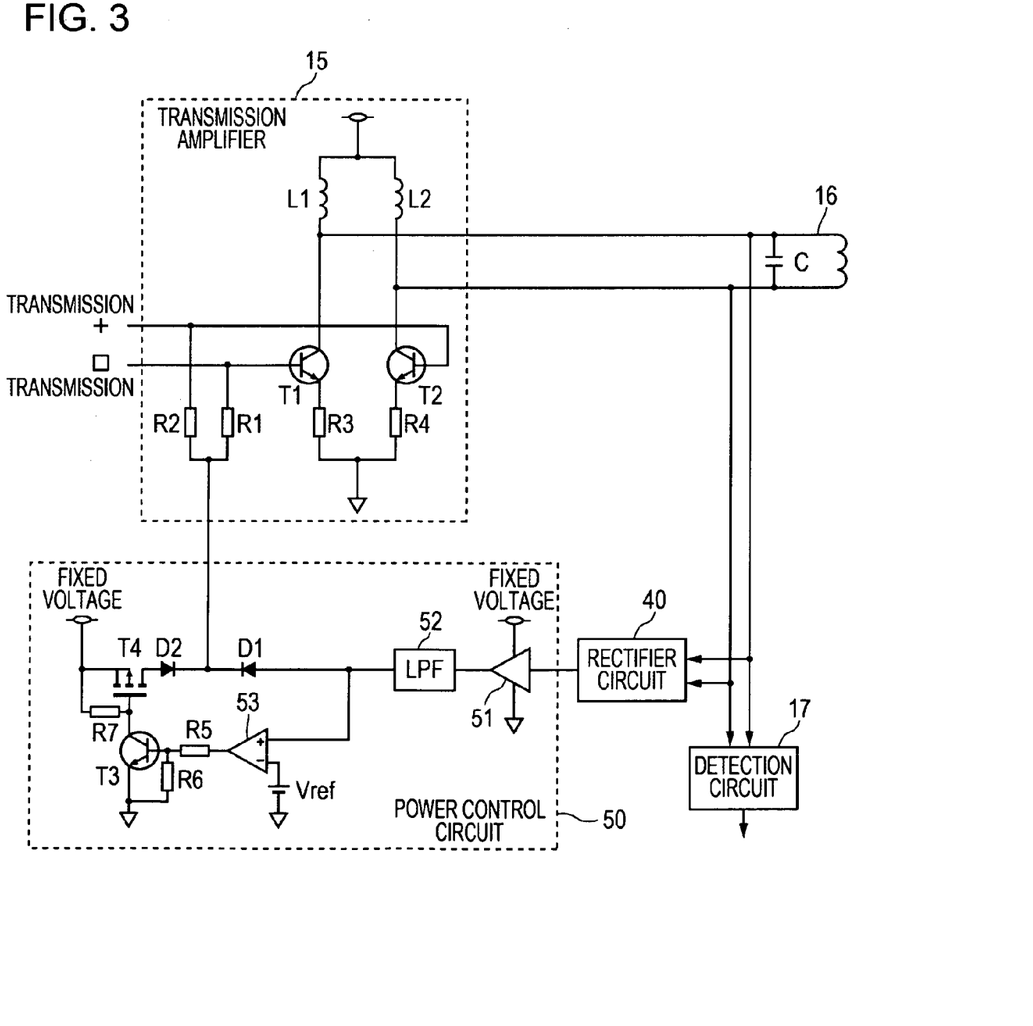
FIG. 3 is a schematic circuit diagram illustrating an example of the configuration of a communication apparatus according to a first embodiment.
Figure 4:
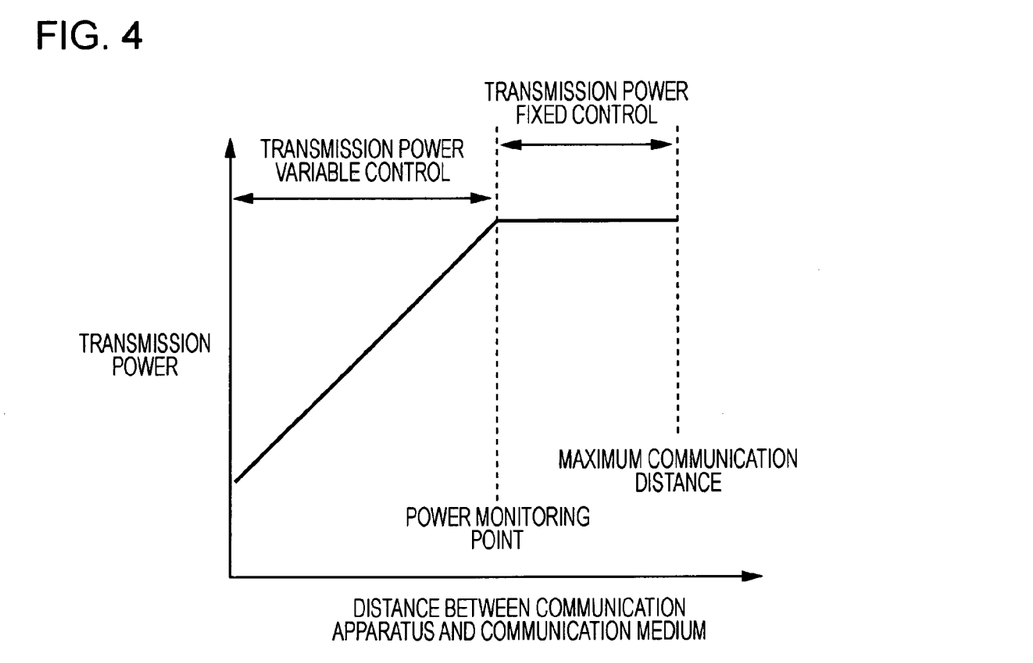
FIG. 4 is a diagram illustrating the control pattern of transmission power in relation to a communication distance adopted by the communication apparatus according to the first embodiment.
Figure 5:
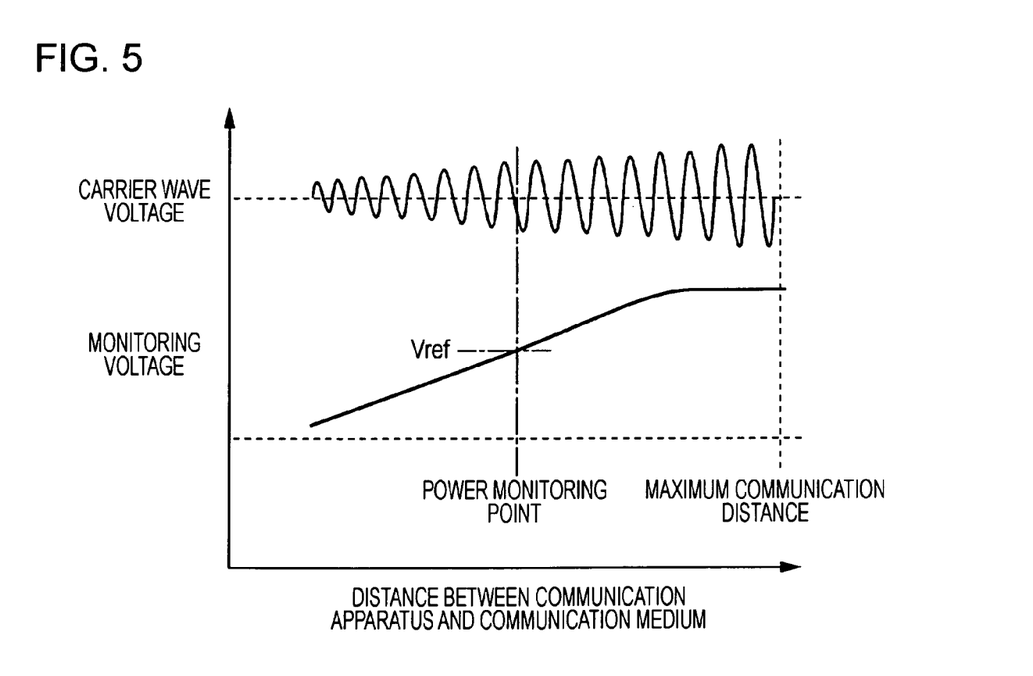
FIG. 5 is a diagram illustrating the detection images of a change in a carrier wave and a monitoring voltage in relation to the communication distance.
Figure 6:
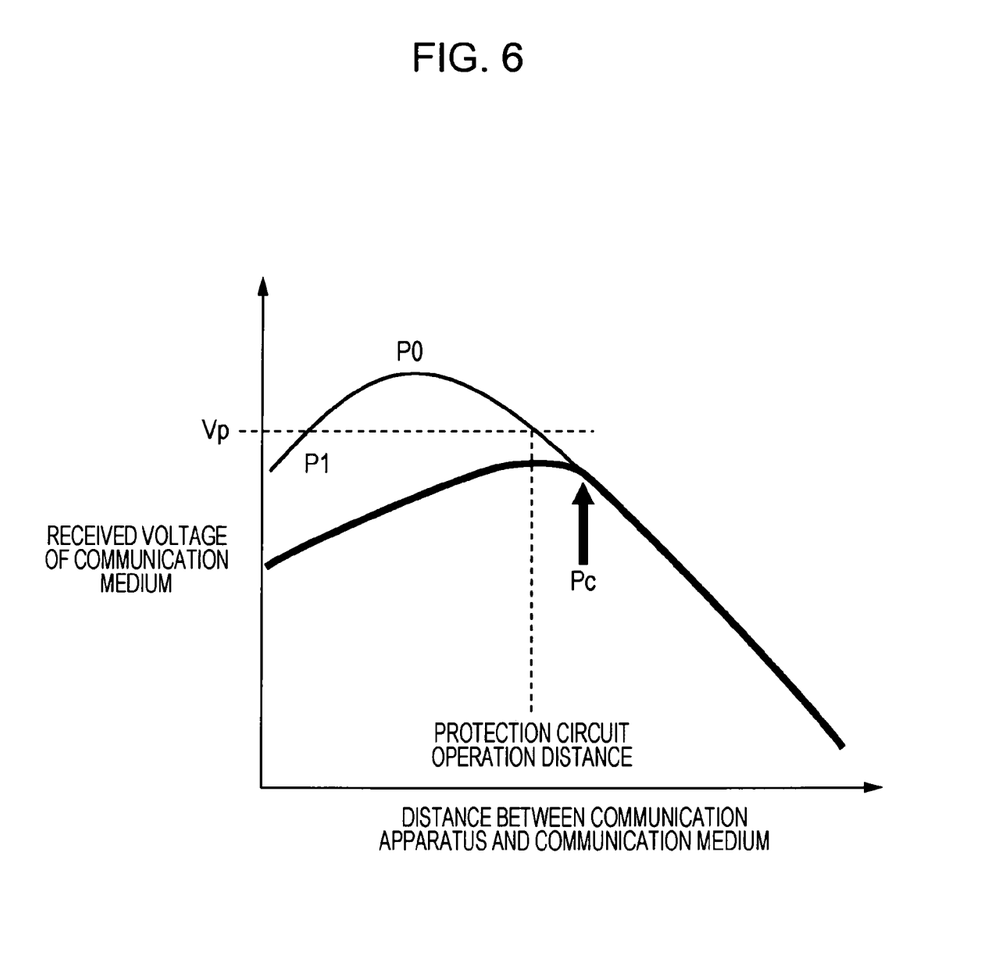
FIG. 6 is a diagram illustrating the received voltage characteristics of the communication medium.

FIG. 3 is a schematic circuit diagram illustrating an example of the configuration of a communication apparatus according to a first embodiment. FIG. 4 is a diagram illustrating the control pattern of the transmission power in relation to the communication distance adopted by the communication apparatus according to the first embodiment. FIG. 5 is a diagram illustrating the detection images of a change in a carrier wave and the monitoring voltage in relation to the communication distance. FIG. 6 is a diagram illustrating the characteristics of the received voltage of the communication medium 30. It is to be noted that, in FIG. 4, the horizontal axis represents the distance between the communication apparatus 10 and the communication medium 30, and the vertical axis represents the transmission power of the transmission amplifier 15. In FIG. 5, the horizontal axis represents the distance between the communication apparatus 10 and the communication medium 30, and the vertical axis represents the carrier wave voltage and the monitoring voltage. In FIG. 6, the horizontal axis represents the distance between the communication apparatus 10 and the communication medium 30, and the vertical axis represents the received voltage of the communication medium 30.

In the communication apparatus 10 according to the first embodiment, control of the transmission power of the transmission amplifier 15 is realized by controlling the base bias voltage of transistors included in the transmission amplifier 15.

The transmission amplifier 15 has two transistors T1 and T2 that form a differential amplification circuit having a certain frequency. To the bases of the transistors T1 and T2, resistors R1 and R2 that receive the base bias voltage are connected, and the emitters of the transistors T1 and T2 are connected to the ground through resistors R3 and R4. The collectors of the transistors T1 and T2 are connected to a power source through inductors L1 and L2 and also connected to the antenna 16. To the antenna 16, a capacitor C included in a parallel resonant circuit is connected.

Terminals at both ends of the antenna 16 are connected to a rectifier circuit 40, which corresponds to the communication distance detection unit 19 of FIG. 1. The rectifier circuit 40 attenuates the alternating voltage of a carrier wave generated by the antenna 16 at an appropriate division ratio, so that the alternating voltage is suitable for the operation level of a power control circuit 50 in the subsequent stage. By rectifying the attenuated alternating voltage, the rectifier circuit 40 converts the voltage into a direct current value corresponding to the distance between the communication apparatus 10 and the communication medium 30. A signal that indicates the distance to the communication medium 30 is supplied to the power control circuit 50 as a monitoring voltage.

The power control circuit 50 corresponds to the transmission power control unit 20 of FIG. 1 and has a buffer circuit 51 that receives signals from the rectifier circuit 40. The output of the buffer circuit 51 is connected to a low-pass filter (LPF) 52, which removes unnecessary noise therefrom. The output of the low-pass filter 52 is connected, on the one hand, to the resistors R1 and R2 of the transmission amplifier 15 through a diode D1 and, on the other hand, to the non-inverting input of a comparator 53. To the inverting input of the comparator 53, a reference voltage Vref is connected. The voltage value of the reference voltage Vref corresponds to the voltage of a power monitoring point at which fixed control and variable control of the transmission power of the transmission amplifier 15 are switched. The output of the comparator 53 is connected to the base of a transistor T3 through a resistor R5. The base of the transistor T3 is connected to the ground through a resistor R6, and the emitter of the transistor T3 is directly connected to the ground. The collector of the transistor T3 is connected to the gate of a transistor T4 and is also connected to a power source having a fixed voltage through a resistor R7. The source of the transistor T4 is connected to the power source having a fixed voltage and the drain of the transistor T4 is connected to the resistors R1 and R2 of the transmission amplifier 15 through a diode D2. The transistors T3 and T4 form a switching element that outputs a fixed voltage or inhibits the fixed voltage from being output in accordance with the output of the comparator 53. The diodes D1 and D2 form an OR circuit, and the voltage of whichever diode has a higher potential on the anode side is supplied to the transmission amplifier 15 as a base bias voltage.

When an unmodulated or a modulated carrier wave is input to the transmission amplifier 15 from the modulator 14 as a transmission signal in the form of a complementary type, the transmission signal is amplified by the transistors T1 and T2 and supplied to the antenna 16.

The carrier wave voltage in the antenna 16 is received by the rectifier circuit 40 and converted into a signal that indicates the distance between the communication apparatus 10 and the communication medium 30. The converted signal is then input to the buffer circuit 51 of the power control circuit 50 as a monitoring voltage, and the output of the buffer circuit 51 is input to the low-pass filter 52, which removes the noise thereof and suppresses a sudden change in the monitoring voltage.

The monitoring voltage of the output of the low-pass filter 52 is compared with the reference voltage Vref by the comparator 53. When the communication medium 30 is located far from the communication apparatus 10, since the transmission power of the transmission amplifier 15 is set to the maximum and the monitoring voltage is higher than the reference voltage Vref, the comparator 53 outputs a high-level signal. Accordingly, the transistor T3 is turned on and the transistor T4 is also turned on, and therefore a voltage that is substantially equal to the fixed voltage is supplied to the resistors R1 and R2 of the transmission amplifier 15 through the diode D2. This voltage is supplied to the bases of the transistors T1 and T2 as a base bias voltage and accordingly the transmission amplifier 15 amplifies a carrier wave to the maximum and supplies the carrier wave to the antenna 16. The control for keeping the transmission power of the transmission amplifier 15 at a maximum continues, as illustrated in FIG. 4, until the communication medium 30 reaches a point called a "power monitoring point" from which the communication apparatus 10 is located at a certain distance. After that, as in the case of attenuation illustrated in FIG. 2, the carrier wave voltage gradually decreases as the communication medium 30 approaches the communication apparatus 10, and therefore the monitoring voltage also gradually decreases as the communication medium 30 approaches the communication apparatus 10 as illustrated in FIG. 5.

When the communication medium 30 further approaches the communication apparatus 10 and accordingly the monitoring voltage decreases to a voltage lower than the reference voltage Vref of the power monitoring point, the output of the comparator 53 is inverted and the comparator 53 outputs a low-level signal. Accordingly, the transistor T3 is turned off and the transistor T4 is also turned off, thereby making the fixed voltage that has been supplied to the resistors R1 and R2 of the transmission amplifier 15 through the diode D2 be zero. Instead of that, the monitoring voltage of the output of the low-pass filter 52 is supplied to the resistors R1 and R2 of the transmission amplifier 15 through the diode D1. As illustrated in FIG. 5, since this monitoring voltage gradually decreases as the distance to the communication medium 30 becomes small, the voltage supplied to the bases of the transistors T1 and T2 as a base bias voltage also gradually decreases. As a result, as illustrated in FIG. 4, variable control of the transmission power in which the transmission power of the transmission amplifier 15 decreases as the distance to the communication medium 30 becomes small is performed.

When the communication medium 30 is approaching the communication apparatus 10, by performing control such that the transmission power is fixed at the maximum until a certain point and then by performing variable control such that the transmission power decreases, the maximum communication distance up to which the communication medium 30 can receive power can be secured while the power to be received is prevented from becoming excessive. That is, on the one hand, if the communication apparatus 10 performs transmission without controlling the transmission power, when the communication medium 30 approaches the communication apparatus 10 from a distance as illustrated in FIG. 6 by a curve P0, the received voltage accordingly increases. When the communication medium 30 has approached beyond a distance at which the protection circuit of the communication medium 30 starts to operate, the received voltage increases to more than a voltage Vp at which the protection circuit starts to operate. On the other hand, by controlling the transmission power of the transmission amplifier 15 of the communication apparatus 10 such that the transmission power starts to decrease at a point Pc, where the voltage is lower than the voltage Vp at which the protection circuit starts to operate, the received voltage of the communication medium 30 does not exceed the voltage Vp at which the protection circuit starts to operate as illustrated in FIG. 6 by a curve P1. Thus, the communication medium 30 can be prevented from being broken or the performance thereof can be prevented from being deteriorated due to heating caused by excessive received power.

Figure 7:
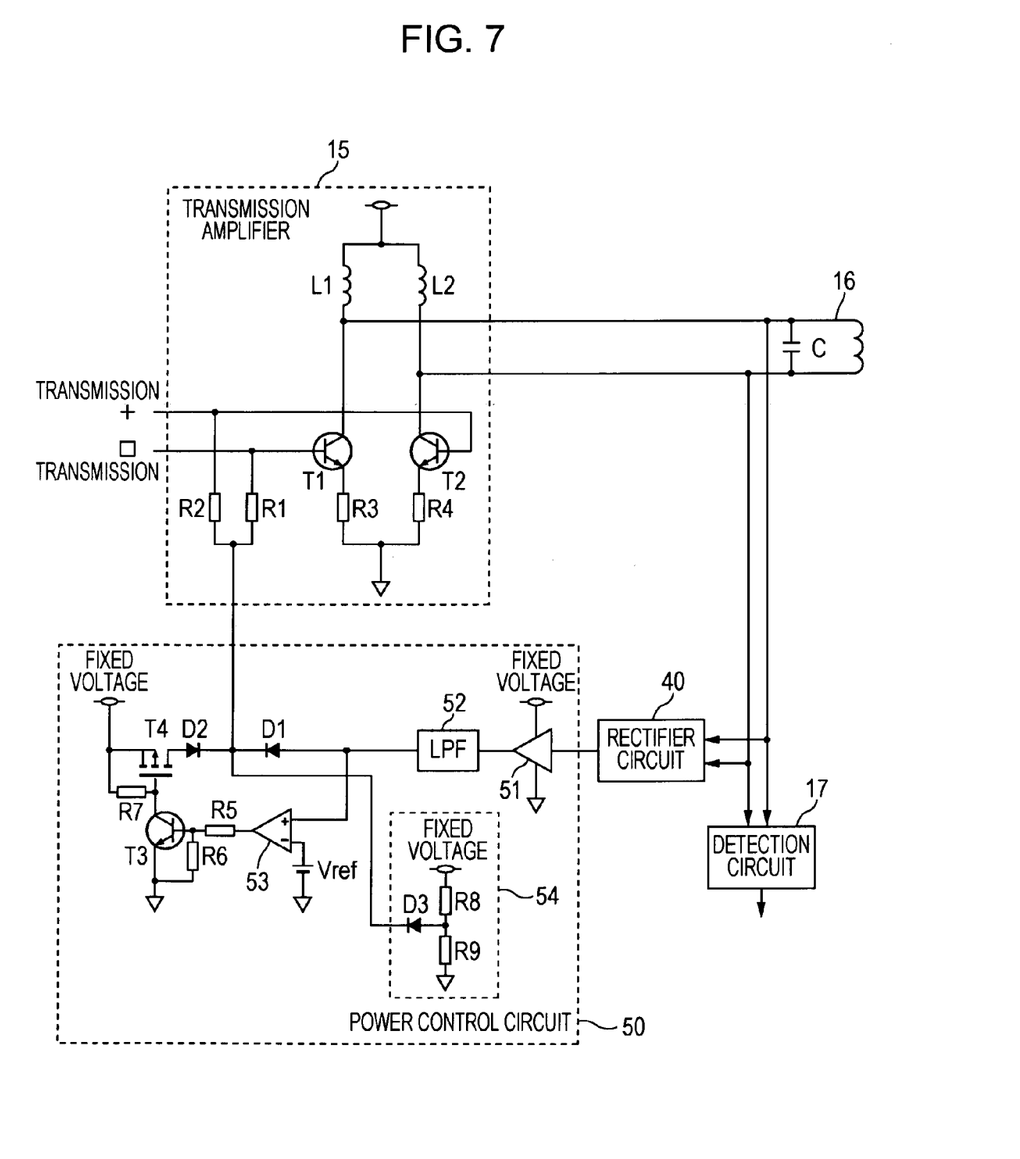
FIG. 7 is a schematic circuit diagram illustrating an example of the configuration of a communication apparatus according to a second embodiment.
Figure 8:
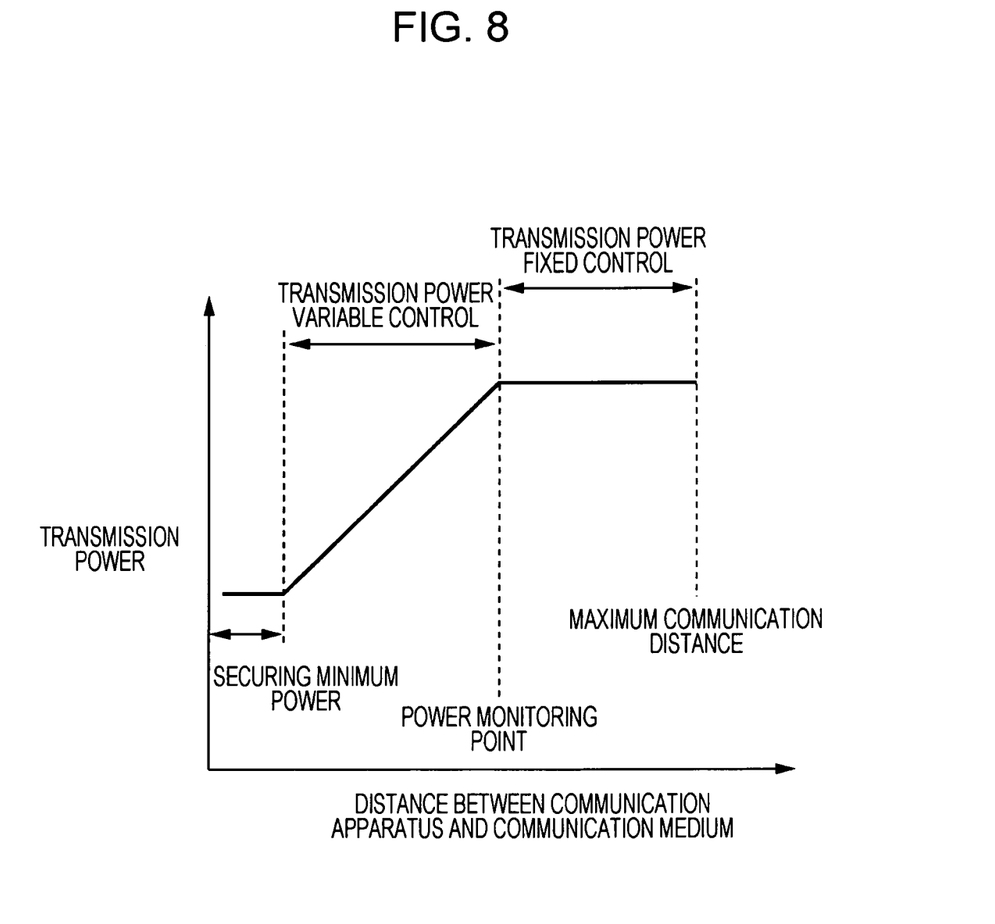
FIG. 8 is a diagram illustrating the control pattern of transmission power in relation to the communication distance adopted by the communication apparatus according to the second embodiment.

FIG. 7 is a schematic circuit diagram illustrating an example of the configuration of a communication apparatus according to a second embodiment. FIG. 8 is a diagram illustrating the control pattern of the transmission power in relation to the communication distance adopted by the communication apparatus according to the second embodiment. In FIG. 7, the same components as those illustrated in FIG. 3 are given the same reference numerals so as to omit detailed description thereof.

The communication apparatus 10 according to the second embodiment is configured to secure minimum power when the transmission power of the transmission amplifier 15 is controlled such that the transmission power decreases as the communication medium 30 approaches the communication apparatus 10, so that the transmission power of the transmission amplifier 15 does not decrease too much and does not cause a power shortage.

Therefore, the communication apparatus 10 according to the second embodiment has a minimum power securing circuit in the power control circuit 50. The minimum power securing circuit 54 has a voltage divider that includes two resistors R8 and R9 connected in series, and a diode D3 connected to a node between the resistors R8 and R9. The diode D1 that supplies a variable monitoring voltage, the diode D2 that supplies a fixed high voltage, and the diode D3 that supplies a fixed low voltage for securing minimum power together form an OR circuit. The voltage of whichever diode has the highest voltage on the anode side potential is supplied to the transmission amplifier 15 as a base bias voltage.

By supplying any of the two fixed voltages and the one variable voltage to the transmission amplifier 15 with the power control circuit 50 through the OR circuit, the communication apparatus 10 obtains the transmission power characteristics illustrated in FIG. 8. That is, when the monitoring voltage, which is the output of the low-pass filter 52, decreases lower than the output voltage of the minimum power securing circuit 54 while the transmission power decreases as the communication medium 30 approaches the communication apparatus 10, the base bias voltage is switched to the fixed voltage of the minimum power securing circuit 54 and does not decrease any more. Thus, the communication apparatus 10 does not suffer a power shortage even when the transmission power of the transmission amplifier 15 decreases as the communication medium 30 approaches a position close to the communication apparatus 10, thereby preventing the quality of communication with the communication medium 30 from being deteriorated.

Figure 9:
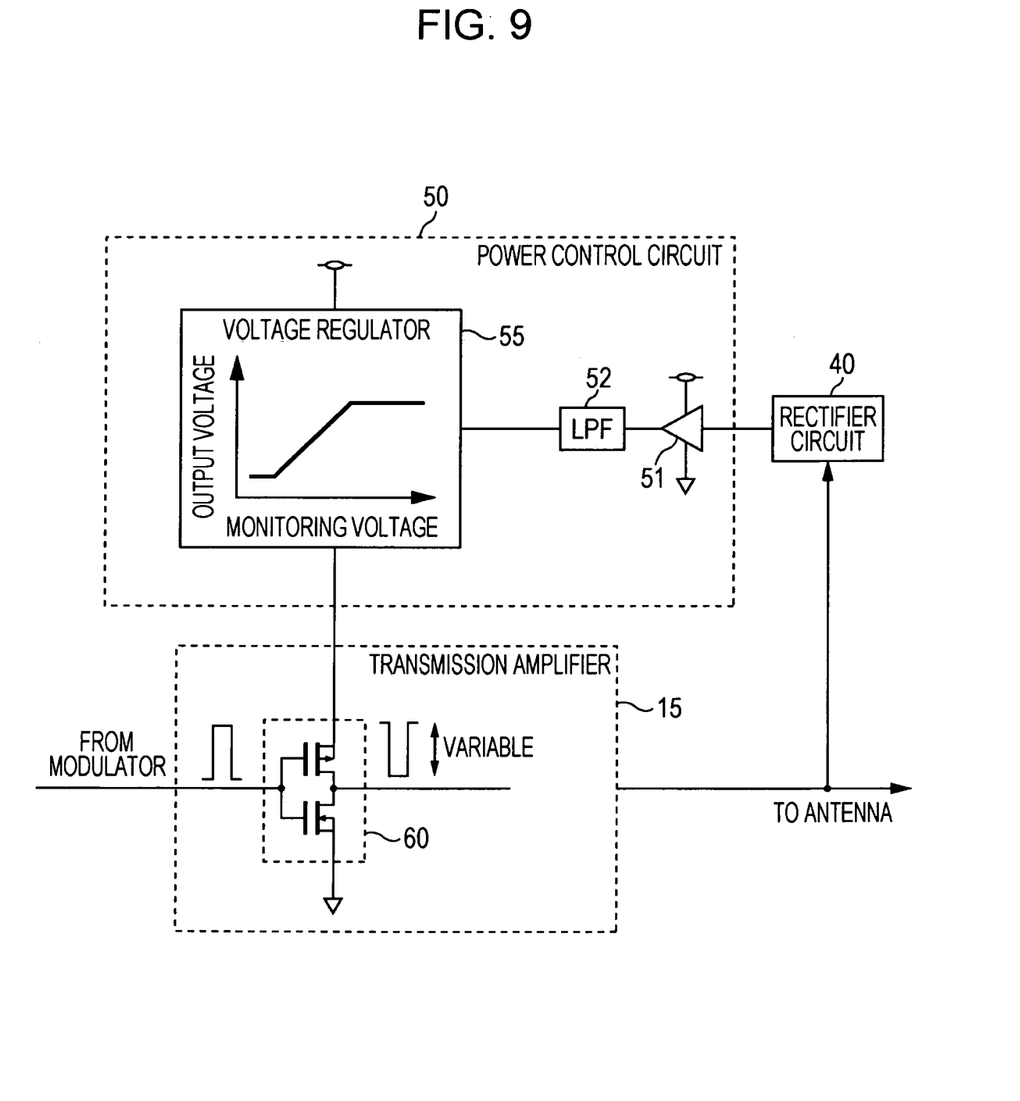
FIG. 9 is a schematic circuit diagram illustrating an example of the configuration of a communication apparatus according to a third embodiment.

FIG. 9 is a schematic circuit diagram illustrating an example of the configuration of a communication apparatus according to a third embodiment. In FIG. 9, the same components as those illustrated in FIGS. 3 and 7 are given the same reference numerals so as to omit detailed description thereof.

The communication apparatus 10 according to the third embodiment performs control of the transmission power of the transmission amplifier 15 by attenuating the level of a signal input to the transmission amplifier 15, that is, the amplitude of a modulated or an unmodulated carrier wave.

In this embodiment, the attenuation of a signal input to the transmission amplifier 15 is performed by reducing the power supply voltage of an input circuit that receives the signal. That is, the power control circuit 50 has a voltage regulator 55 that receives the monitoring voltage output from the low-pass filter 52 and that adjusts the power supply voltage to a variable output voltage, and the transmission amplifier 15 has, for example, a buffer circuit 60 in the input stage thereof. Here, the base bias voltage of the transistors that form the transmission amplifier 15 is fixed.

The voltage regulator 55 has, for example, control characteristics similar to those illustrated in FIG. 8, and outputs the output voltage adjusted in accordance with the control characteristics upon input of the monitoring voltage. This variable output voltage is the power supply voltage for the buffer circuit 60 of the transmission amplifier 15. The buffer circuit 60 may be, for example, an inverter circuit formed of a complementary metal oxide semiconductor (CMOS), and the amplitude of an input signal received from the modulator 14 varies in accordance with the output voltage of the voltage regulator 55. Thus, by causing the base signal input to the bases of the transistors to vary, the transmission amplifier 15 can realize variable control of the transmission power similar to that in which the base bias voltage varies.

It is to be noted that although the control characteristics of the voltage regulator 55 are similar to those illustrated in FIG. 8 as an example in this embodiment, the control characteristics may be similar to those illustrated in FIG. 4.

It is to be understood that, although the present invention has been described with reference to the preferred embodiments thereof, the present invention is, needless to say, not limited to these particular embodiments and may be altered or modified in various ways, so long as the spirit thereof is not deviated from. For example, although the power control circuit 50 is realized by the configuration of hardware, the monitoring voltage output from the rectifier circuit 40 may be converted into data by an analog/digital converter, and the amplification ratio adopted by the transmission amplifier 15 may be controlled by processing the data with software. In addition, although the power control circuit 50 detects a particular fixed power monitoring point with the comparator 53 that compares the monitoring voltage with the reference voltage Vref, the power monitoring point may be changed to an optimal point by monitoring the monitoring voltage with software and by dynamically setting the power monitoring point in accordance with the conditions because the power monitoring point can change depending on the device and with time.

It should be understood by those skilled in the art that various modifications, combinations, sub-combinations and alterations may occur depending on design requirements and other factors insofar as they are within the scope of the appended claims or the equivalents thereof.

What is claimed is:

1. A communication apparatus that performs communication with a communication medium while supplying power to the communication medium, the communication apparatus comprising:
    a communication distance detection unit configured to detect a distance to the communication medium; and
    a transmission power control unit configured to control transmission power of a transmission amplifier in accordance with the detected distance,
    wherein, when the distance to the communication medium detected by the communication distance detection unit is larger than a certain distance, the transmission power control unit performs fixed control such that the transmission power of the transmission amplifier is fixed at a maximum value of transmission power, and
    wherein, when the distance to the communication medium is smaller than the certain distance, the transmission power control unit performs variable control such that the transmission power of the transmission amplifier decreases linearly as the distance to the communication medium becomes smaller.

2. The communication apparatus according to claim 1, wherein the communication distance detection unit detects a carrier wave voltage and then detects the distance to the communication medium on the basis of results of the detection of the carrier wave voltage.

3. A communication apparatus that performs communication with a communication medium while supplying power to the communication medium, the communication apparatus comprising:
    a communication distance detection unit configured to detect a distance to the communication medium; and
    a transmission power control unit configured to control transmission power of a transmission amplifier in accordance with the detected distance,
    wherein, when the distance to the communication medium detected by the communication distance detection unit is larger than a first certain distance, the transmission power control unit performs fixed control, so that the transmission power of the transmission amplifier is fixed, when the distance to the communication medium is equal to or smaller than the first certain distance and equal to or larger than a second certain distance, which is smaller than the first certain distance, the transmission power control unit performs variable control, so that the transmission power of the transmission amplifier decreases as the distance to the communication medium becomes smaller, and, when the distance to the communication medium is smaller than the second certain distance, the transmission power control unit performs fixed control, so that the transmission power of the transmission amplifier is fixed.

4. A communication apparatus that performs communication with a communication medium while supplying power to the communication medium, the communication apparatus comprising:
    a communication distance detection unit configured to detect a distance to the communication medium; and
    a transmission power control unit configured to control transmission power of a transmission amplifier in accordance with the detected distance,
    wherein the communication distance detection unit detects a carrier wave voltage and then detects the distance to the communication medium on the basis of results of the detection of the carrier wave voltage,
    wherein the communication distance detection unit includes a rectifier circuit that outputs a signal having a value corresponding to the distance to the communication medium as a monitoring voltage by rectifying the detected carrier wave voltage,
    wherein the transmission power control unit includes
    a comparator that compares the monitoring voltage with a reference voltage having a value corresponding to a value of voltage when the distance to the communication medium is equal to a certain distance, and
    a switching element that outputs a certain fixed voltage to the transmission amplifier as the bias voltage when the comparator detects that the monitoring voltage is higher than the reference voltage,
    wherein the transmission power control unit outputs the monitoring voltage to the transmission amplifier as the bias voltage when the comparator does not output the fixed voltage, wherein the transmission power control unit includes
- a comparator that compares the monitoring voltage with a reference voltage having a value corresponding to a value of voltage when the distance to the communication medium is equal to a certain distance,
- a switching element that outputs a first fixed voltage to the transmission amplifier as the bias voltage when the comparator detects that the monitoring voltage is higher than the reference voltage, and
- a minimum power securing circuit that outputs a second fixed voltage, which is lower than the reference voltage, to the transmission amplifier as the bias voltage, and wherein the transmission power control unit outputs the monitoring voltage to the transmission amplifier as the bias voltage when the comparator does not output the first fixed voltage and the minimum power securing circuit does not output the second fixed voltage.

5. A communication apparatus that performs communication with a communication medium while supplying power to the communication medium, the communication apparatus comprising:
- a communication distance detection unit configured to detect a distance to the communication medium; and
- a transmission power control unit configured to control transmission power of a transmission amplifier in accordance with the detected distance, wherein the communication distance detection unit detects a carrier wave voltage and then detects the distance to the communication medium on the basis of results of the detection of the carrier wave voltage, wherein the communication distance detection unit includes a rectifier circuit that outputs a signal having a value corresponding to the distance to the communication medium as a monitoring voltage by rectifying the detected carrier wave voltage, wherein the transmission power control unit controls the transmission power of the transmission amplifier by causing an amplitude of a signal input to the transmission amplifier to vary in accordance with the monitoring voltage, wherein the amplitude of the signal input to the transmission amplifier is controlled by causing a voltage of a buffer circuit provided in an input stage of the transmission amplifier to vary, wherein the transmission power control unit has a voltage regulator that, when the monitoring voltage is higher than a first certain voltage, outputs a first fixed voltage as a power supply for the buffer circuit, when the monitoring voltage is lower than a second certain voltage, which is lower than the first certain voltage, outputs a second fixed voltage, which is lower than the first fixed voltage, as the power supply for the buffer circuit, and, when the monitoring voltage is equal to or lower than the first certain voltage and equal to or higher than the second certain voltage, outputs a variable voltage that varies from the first fixed voltage to the second fixed voltage as the monitoring voltage changes from the first certain voltage to the second certain voltage.

6. A communication method with which a communication apparatus performs communication with a communication medium while supplying power to the communication medium, the communication method comprising the steps of:
- detecting a distance to the communication medium by using the communication apparatus; and
- controlling transmission power of a transmission amplifier of the communication apparatus in accordance with the detected distance, wherein, when the distance to the communication medium detected by the detecting step is larger than a certain distance, the controlling step performs fixed control such that the transmission power of the transmission amplifier is fixed at a maximum value of transmission power, and wherein, when the distance to the communication medium is smaller than the certain distance, the controlling step performs variable control such that the transmission power of the transmission amplifier decreases linearly as the distance to the communication medium becomes smaller.

* * * * *